US011369080B2

(12) United States Patent
Lu

(10) Patent No.: US 11,369,080 B2
(45) Date of Patent: Jun. 28, 2022

(54) FURNITURE FOR PET CATS

(71) Applicant: Xiamen Sunnypet Products Co.,Ltd., Xiamen (CN)

(72) Inventor: Kongzhi Lu, Xiamen (CN)

(73) Assignee: Xiamen Sunnypet Products Co., Ltd., Xiamen (CN)

( * ) Notice: Subject to any disclaimer, the term of this patent is extended or adjusted under 35 U.S.C. 154(b) by 386 days.

(21) Appl. No.: 16/367,279

(22) Filed: Mar. 28, 2019

(65) Prior Publication Data
US 2020/0093091 A1   Mar. 26, 2020

(30) Foreign Application Priority Data

Sep. 26, 2018   (CN) .......................... 201811123369.6

(51) Int. Cl.
*A01K 1/03* (2006.01)
*A01K 15/02* (2006.01)

(52) U.S. Cl.
CPC ............ *A01K 1/033* (2013.01); *A01K 15/024* (2013.01)

(58) Field of Classification Search
CPC ........ A01K 1/033; A01K 1/035; A01K 15/02; A01K 15/025
See application file for complete search history.

(56) References Cited

U.S. PATENT DOCUMENTS

| 2,639,819 | A | * | 5/1953 | Marks | ..................... | A47B 43/04 |
| | | | | | | 108/164 |
| 5,577,465 | A | * | 11/1996 | Cook | ..................... | A01K 1/033 |
| | | | | | | 119/28.5 |
| 5,775,046 | A | * | 7/1998 | Fanger | ................. | A47B 81/061 |
| | | | | | | 108/158.12 |
| 5,960,739 | A | * | 10/1999 | Storm | .................. | A01K 1/0353 |
| | | | | | | 119/28.5 |
| 6,338,314 | B1 | * | 1/2002 | Widrich | ............... | A01K 1/0353 |
| | | | | | | 119/28.5 |
| 6,397,778 | B1 | * | 6/2002 | Tripp | ................... | A01K 1/0353 |
| | | | | | | 119/28.5 |
| D465,620 | S | * | 11/2002 | Stepp | ........................... | 119/28.5 |
| D682,951 | S | * | 5/2013 | Sandhei | ...................... | D21/506 |

(Continued)

FOREIGN PATENT DOCUMENTS

CN   201131222 Y   10/2008
CN   203608693 U    5/2014

OTHER PUBLICATIONS

Jaya Schuerch, Suspended Cube, 2005, http://www.jayaschuerch.com/Suspended%20Cube.htm (Year: 2005).*

*Primary Examiner* — Tien Q Dinh
*Assistant Examiner* — Katelyn T Truong
(74) *Attorney, Agent, or Firm* — Bayramoglu Law Offices LLC

(57) ABSTRACT

A piece of furniture for pet cats includes an outer frame and an inner house. The outer frame is a polyhedral frame structure. The inner house is fixedly suspended in the outer frame by a plurality of connection members. The inner house is provided with at least one entrance. According to the pet furniture for cats with this structure, the pet cat can jump and play between the outer frame and the inner house. Further, when the pet cat climbs on the outer surface of the inner house or slaps on the outer surface of the inner house with the cat's claw, the inner house will shake due to an external force, so the pet cat and receive the response and have more fun in playing.

11 Claims, 9 Drawing Sheets

(56) References Cited

U.S. PATENT DOCUMENTS

| | | | |
|---|---|---|---|
| 9,072,980 B2* | 7/2015 | van Tilburg | A63H 3/52 |
| 9,163,393 B2* | 10/2015 | Carroll | E04B 1/48 |
| 10,849,311 B1* | 12/2020 | Mulvey | A01K 1/033 |
| 2004/0194724 A1* | 10/2004 | Wood | A01K 1/033 119/474 |
| 2008/0134430 A1* | 6/2008 | Kirmon | A01K 1/035 5/10.1 |
| 2009/0045155 A1* | 2/2009 | Howard | A01K 1/035 211/186 |
| 2009/0199782 A1* | 8/2009 | Drumm | A01K 1/033 119/498 |
| 2010/0077961 A1* | 4/2010 | Lipscomb | A01K 15/02 119/28.5 |
| 2010/0154719 A1* | 6/2010 | Kellogg | A01K 1/035 119/706 |
| 2015/0047572 A1* | 2/2015 | Rybka | A01K 1/034 119/479 |
| 2016/0081299 A1* | 3/2016 | Wesley | A01K 1/03 119/452 |
| 2017/0172108 A1* | 6/2017 | Long, Jr. | A01K 15/024 |
| 2017/0339916 A1* | 11/2017 | Deraps | A01K 1/033 |
| 2018/0064061 A1* | 3/2018 | Koskey, Jr. | E06B 7/28 |
| 2018/0249674 A1* | 9/2018 | Koskey, Jr. | A01K 1/033 |
| 2019/0021286 A1* | 1/2019 | Baker | A01K 15/025 |

\* cited by examiner

FURNITURE FOR PET CATS

CROSS REFERENCE TO THE RELATED APPLICATIONS

This application is based upon and claims priority to Chinese Patent Application No. 201811123369.6, filed on Sep. 26, 2018, the entire contents of which are incorporated herein by reference.

TECHNICAL FIELD

The present invention relates to the field of pet supplies, and more particularly to furniture for pet cats.

BACKGROUND

With the improved living quality of people, more and more people keep cat as a pet to divert themselves from loneliness and to meet spiritual needs such as entertainment etc. Some people even treat their pet cat as an important family member. Nowadays, the families raise the pet cat in combination of feeding, training and playing. Therefore, various pet furniture for cats or cat furniture is born at the right moment.

For example, the Chinese patent issued as CN201131222U discloses transformable cat furniture, which is composed of a plurality of baseplates and assembling rods. A plurality of holes are provided on the baseplate. Nuts are provided in the holes. Slotted holes are provided on two ends of the assembling rods, respectively. Nuts are provided in the slotted holes. The baseplate and the assembling rods are connected by bolts. The cat furniture with this structure is detachable and adjustable in size and structure, which can save space. However, the cat furniture merely can be used for the pet cats to play and jump up and down without providing a space for the pet cats to hide and sleep and providing functions other than the use of the pet cat, thereby having some limitations in use.

As another example, the Chinese patent issued as CN203608693U discloses transformable cat furniture, which includes a support pillar and a cat bed. The cat bed is provided at the bottom of the support pillar. A plurality of supports rotatable about the support pillar are sequentially provided on the support pillar from bottom to top. The pet cat can jump, play and rest in the cat furniture disclosed in this patent. Moreover, cat furniture has a simple structure and is easy to pack up and store. However, this kind of cat furniture still has the following defects. 1. The cat furniture has a simple structure, so it is not interesting enough for the pet cat to play thereon. 2. There is poor interaction between the pet cats and the cat furniture. Once the pet cats playing on the cat furniture for a long time without receiving any response from the cat furniture, the cat will get bored. To this end, the present invention provides furniture for pet cats.

SUMMARY

The present invention provides furniture for pet cats, so as to eliminate the defects such as less interest in playing, poor interaction with the pet cat, the cat gets bored easily, and the likes.

The present invention adopts the following technical solutions.

Furniture for pet cats includes an outer frame and an inner house, wherein the outer frame is a polyhedral frame structure; the inner house is fixedly suspended in an interior space of the outer frame by at least two connection members; and the inner house is provided with at least one entrance.

Further, the inner house is a polyhedral structure scaled down in volume according to the outer frame.

Further, an outer surface of one or more sides of the outer frame is wrapped with sisal ropes.

Further, at least one surface of the outer frame is fixedly provided with a cloth cover.

Preferably, the outer frame is a cubic frame; the inner house is a cube; and eight vertices of the inner house are respectively fixed at eight inner corners of the outer frame by the connection members.

Further, the cloth cover is fixedly provided on a top surface of the outer frame; four sides of the top surface of the outer frame are respectively provided with a strip-shaped slot along a lengthwise direction of each of the four sides; the cloth cover is provided with four connection portions passing through the strip-shaped slots correspondingly; and a positioning rod is inserted in each connection portion.

Further, four sides of a bottom surface of the outer frame are respectively provided with a strip-shaped slot along a lengthwise direction of each of the four sides.

Further, the inner house has a sphere shape.

Further, each side of the outer frame is made of a metal rod, a wooden rod or a metal rod sleeved with a wooden rod.

Further, the connection member is any one or a combination of an elastic connection member, a rigid connection member, or a flexible connection member.

According to the above-mentioned description of the structure of the present invention, the present invention has the following advantages over the prior art.

1. According to the pet furniture for cats having such a structure, the inner house is suspended in the interior space of the outer frame having the regular polyhedral structure by the connection members, and the inner house is provided with an entrance. The pet cat can jump and play between the outer frame and the inner house. Also, when the pet cat climbs on the outer surface of the inner house or slaps on the outer surface of the inner house with the cat's claw, the inner house shakes due to an external force, so the pet cat can receive response and pet cat can get more fun in playing.

2. The pet furniture for cats having this structure can be used as a basic unit alone, or can be combined or stacked to form a larger pet cat pleasure ground.

3. According to the pet furniture for cats having this structure, a cloth cover is fixedly provided on the top surface of the outer frame, or a sisal surface cat scratch board is provided on the outer surface of one or more sides of the outer frame, so the pet furniture can be used as a pet cat hammock or the cat pets can sharpen the claws on it.

4. According to the pet furniture for cats having this structure, the strip-shaped slots on the sides of the top surface of the outer frame can serve as connection fixing slots of the cloth cover, and also as a connection hole of two basic units.

DETAILED DESCRIPTION OF THE EMBODIMENTS

The specific embodiments of the present invention will be described hereinafter with reference to the drawings.

Embodiment 1

Figure 1:
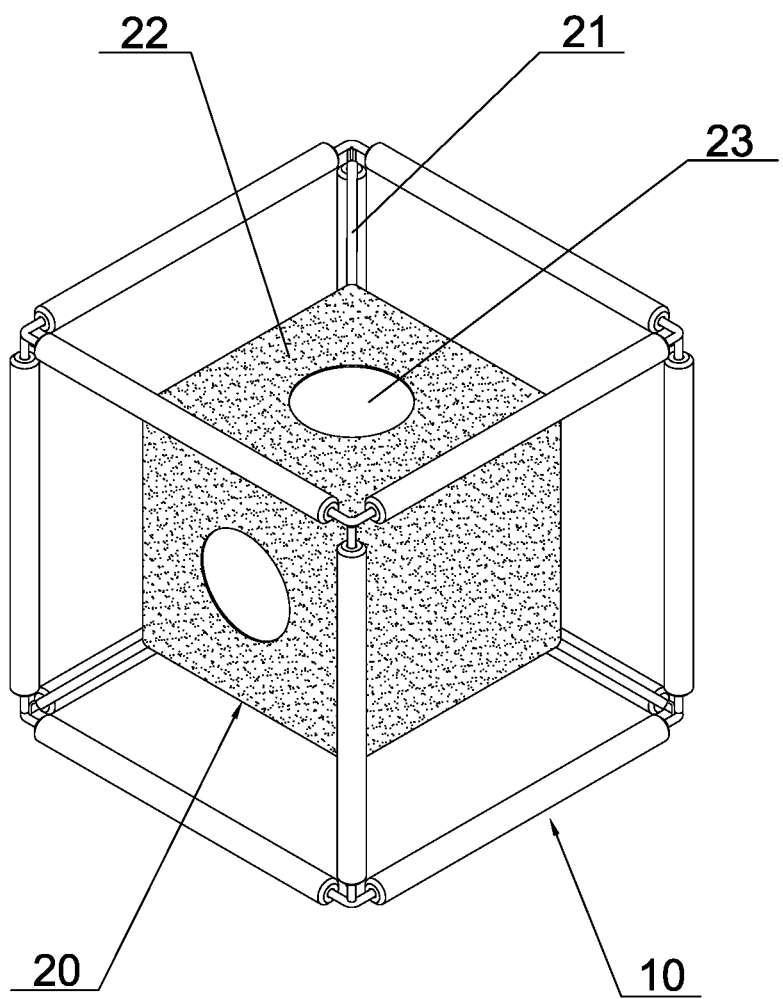
FIG. 1 is a structural schematic diagram of Embodiment 1 of the present invention.
Figure 2:
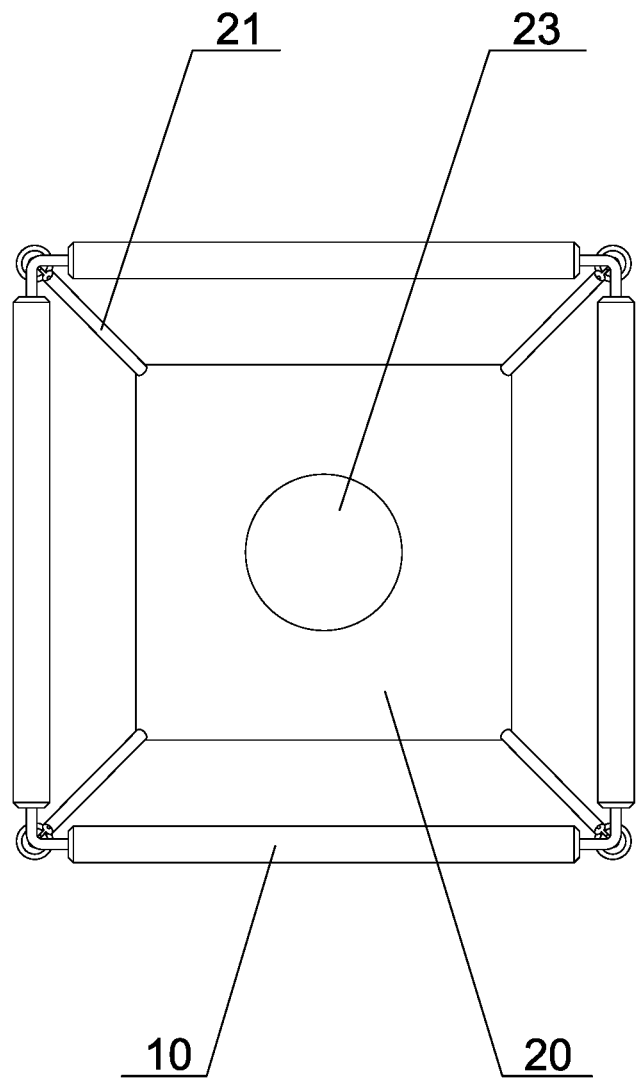
FIG. 2 is a top plan view of Embodiment 1 of the present invention.

As shown in FIG. 1 and FIG. 2, a piece of furniture for pet cats includes an outer frame 10 and an inner house 20. Further, the outer frame 10 of the present embodiment is a cubic frame structure, and the inner house 20 is a cube scaled down in volume according to the outer frame 10. The inner house 20 is fixedly suspended inside the outer frame 10. Specifically, the eight vertices of the inner house 20 are respectively fixed at the eight inner corners of the outer frame 10 by the connection members 21, so that the center of the inner house 20 overlaps with the center of the outer frame 10. The connection member 21 may be any one or a combination of the elastic connection member, the rigid connection member, or the flexible connection member. The connection members 21 made of different materials can provide different play experiences for pet cats.

As shown in FIG. 1, the inner house 20 is preferably made of a hard material. Specifically, the hard material may be a hard wooden board, a hard paper board or a hard plastic board, which are covered by the cloth. The outer surface of the inner house 20 may further be covered with the sisal ropes 22. On the one hand, the sisal rope 22 can be used for the pet cat to play and sharpen the claws. On the other hand, the sisal rope 22 can provide cushioning when the pet cat hits the inner house. Also, the inner house 20 of the present invention may also be made of a soft material as long as the inner house 20 is suspended in the interior space of the outer frame.

As shown in FIG. 1 and FIG. 2, the inner house 20 is provided with at least one entrance 23. Preferably, the top surface of the inner house 20 and one side of the inner house 20 are respectively provided with an entrance 23. The pet cat can enter the inner house from the entrance on the side or the pet cat can directly jump from entrance on the top surface to the top surface of the inner house 20 or the outer frame 10, the pet cat can have more fun in playing.

Each side of the outer frame 10 is made of a metal rod, a wooden rod or a metal rod sleeved with a wooden rod. Of course, the sides of the outer frame 10 may further be made of plastic or other commonly used frame materials. Each side of the outer frame 10 may also be covered by the sisal ropes to provide more spaces for the pet cat to play and sharpen the claws.

Embodiment 2

Figure 3:
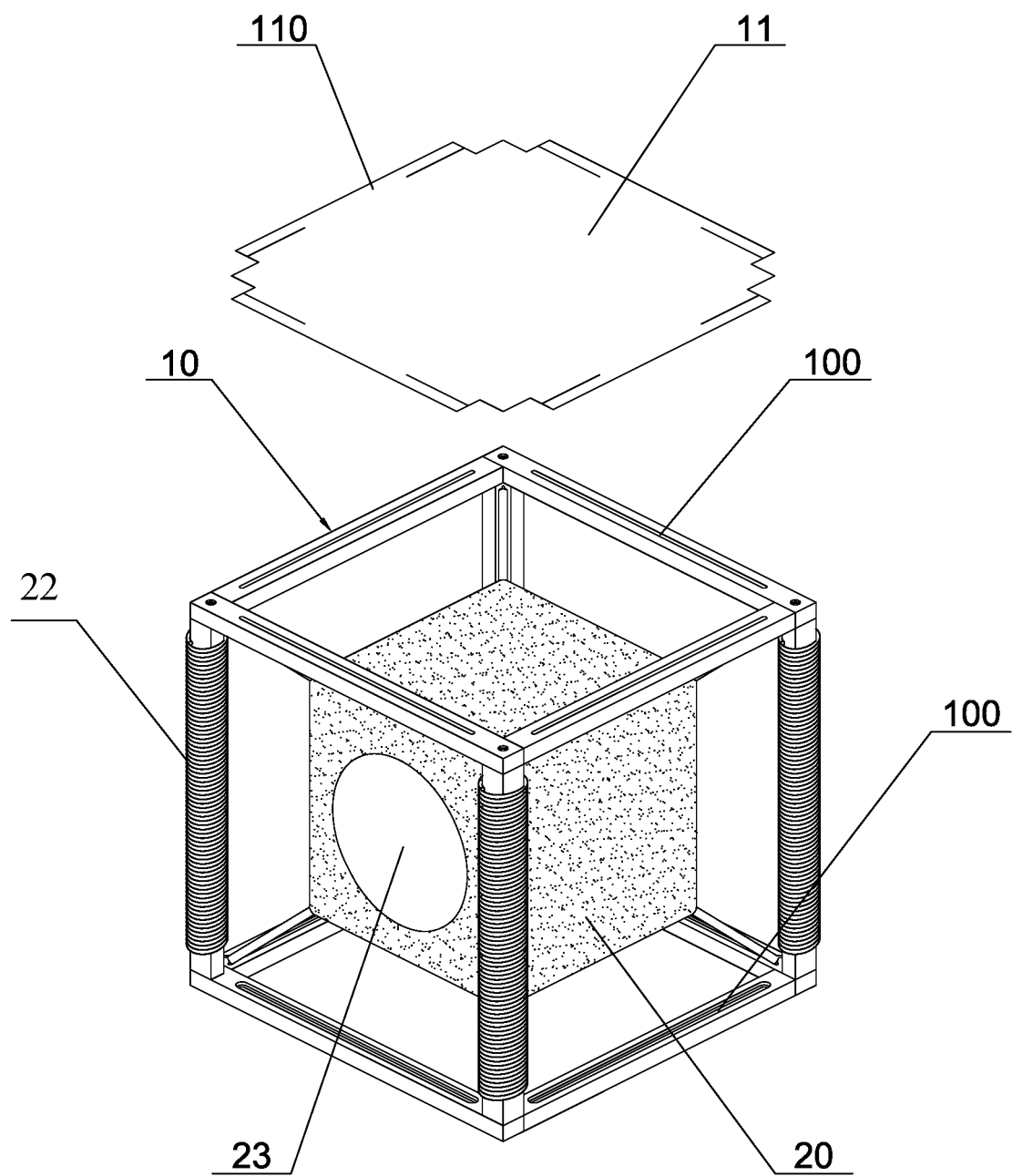
FIG. 3 is an exploded view of Embodiment 2 of the present invention.
Figure 4:
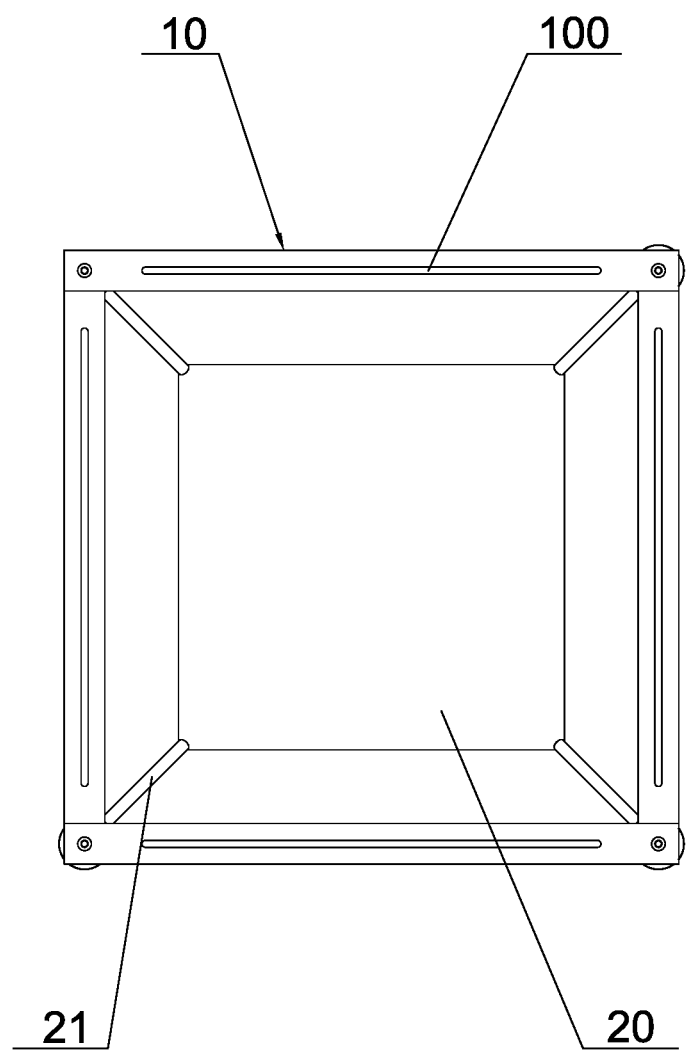
FIG. 4 is a top plan view of Embodiment 2 of the present invention.

As shown in FIG. 3 and FIG. 4, the outer frame 10 of the present embodiment is a cubic frame structure, and the inner house 20 is a cube scaled down in volume according to the outer frame 10. The difference between the present embodiment and Embodiment 1 is the structure of each side of the outer frame 10.

As shown in FIG. 3, a cloth cover 11 is fixedly provided on the top surface of the outer frame 10 of the present embodiment. The cross section of each side of the top surface of the outer frame 10 is rectangular. Four sides of the top surface of the outer frame 10 are respectively provided with a strip-shaped slot 100 along the lengthwise direction of each of the four sides. Four connection portions 110 are provided in the cloth cover 11. Each connection portion 110 correspondingly passes through each of the strip-shaped slots 100, then a positioning rod is inserted to position the connection portions 110.

Figure 5:
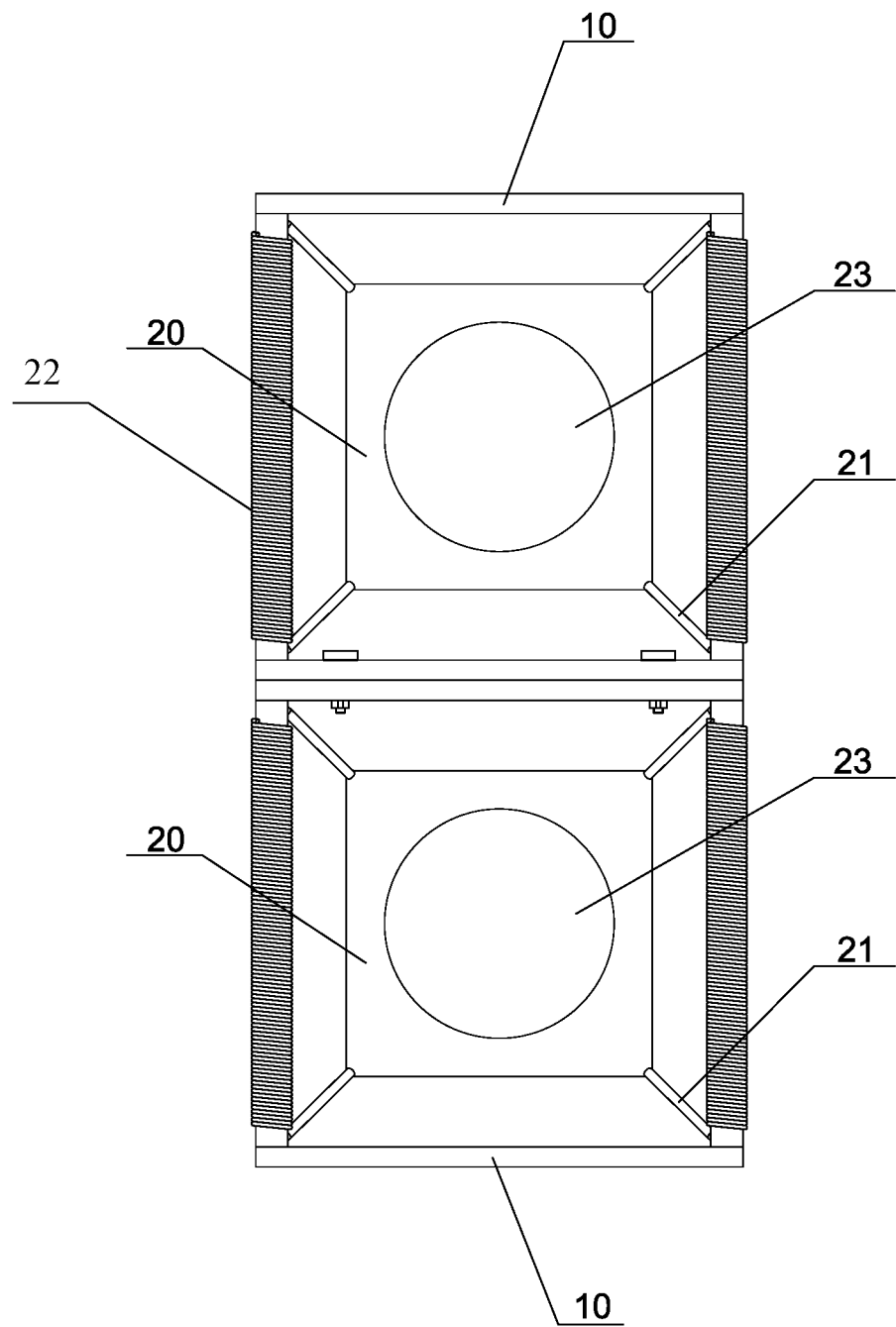
FIG. 5 is a schematic diagram showing that two pieces of pet furniture for cats according to Embodiment 2 of the present invention are stacked.

As shown in FIG. 3 and FIG. 4, four sides of the bottom surface of the outer frame 10 are further respectively provided with a strip-shaped slot 100 along the lengthwise direction of each of the four sides. The pet furniture for cats of the present embodiment may be used as a basic unit. When the expansion in a vertical direction is required, the cloth cover 11 is removed. Then, the four strip-shaped slots 100 on the bottom surface of the outer frame 10 of a piece of pet furniture for cats are connected to the four strip-shaped slots 100 on the top surface of the outer frame of another adjacent pet furniture for cats by bolts (As shown in FIG. 5). When the expansion in a horizontal direction is required, the cloth cover 11 is removed. Then the pet furniture is turned over by 90°, so that the top surface and the bottom surface of the outer frame 10 become a left side wall and a right side wall, respectively. After that, the four strip-shaped slots 100 on the right side wall of the outer frame 10 of one piece of pet furniture for cats are correspondingly connected to the four strip-shaped slots 100 on the left side wall of the outer frame 10 of another adjacent pet furniture for cats by bolts. Of course, the four sides of the left side wall or the right side wall of the outer frame of the pet furniture for cats of the present invention may also be provided with strip-shaped slots 100, so that the pet furniture for cats can be expanded in the vertical direction and the horizontal direction, simultaneously.

Embodiment 3

Figure 6:
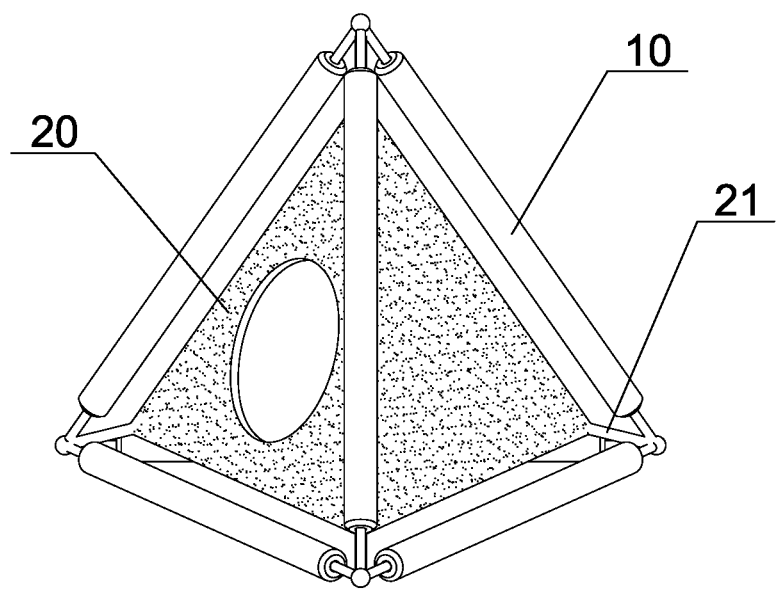
FIG. 6 is a structural schematic diagram of Embodiment 3 of the present invention.
Figure 7:
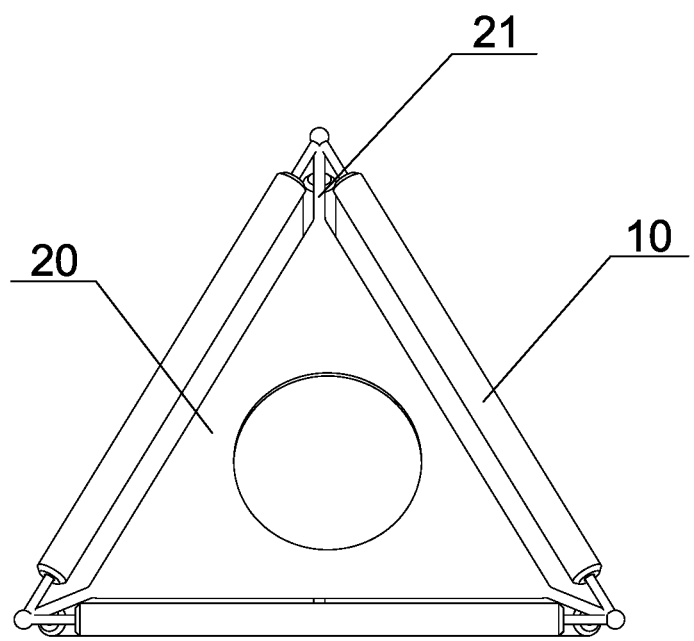
FIG. 7 is a front view of Embodiment 3 of the present invention.

As shown in FIG. 6 and FIG. 7, the pet furniture for cats of the present embodiment includes an outer frame 10 and an inner house 20. In the present embodiment, the structure of each side of the outer frame 10 and the material of the inner house 20 are the same as that of Embodiment 1. The main difference between the present embodiment and Embodiment 1 is that the outer frame 10 of the present embodiment is a regular tetrahedral frame structure, and the inner house 20 a regular tetrahedron scaled down in volume according to the outer frame 10. The inner house 20 is fixedly suspended inside the outer frame 10. Specifically, four vertices of the inner house 20 are respectively fixed at the four inner corners of the outer frame 10 by the connection members 21, so that the center of the inner house 20 overlaps with the center of the outer frame 10. The connection member 21 may be any one or a combination of an elastic connection member, a rigid connection member, or a flexible connection member.

Of course, the cross section of each side of the outer frame 10 of the present embodiment may be rectangular. Three sides on each side surface of the outer frame 10 are respectively provided with a strip-shaped slot along the lengthwise direction of each of the three sides, so that the pet furniture for cats can be expanded along the direction of each side surface. When the pet furniture for cats is expanded in the direction of each side surface, the strip-shaped slots on the side surface of one outer frame are screwed and connected to the strip-shaped slots on the side surface of another outer frame by bolts.

Embodiment 4

Figure 8:
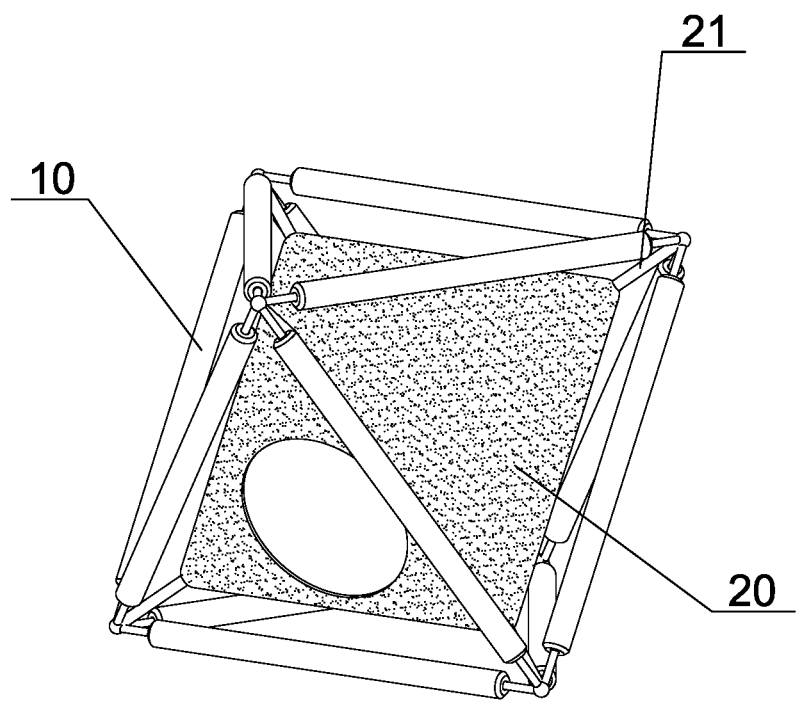
FIG. 8 is a first structural schematic diagram of Embodiment 4 of the present invention.
Figure 9:
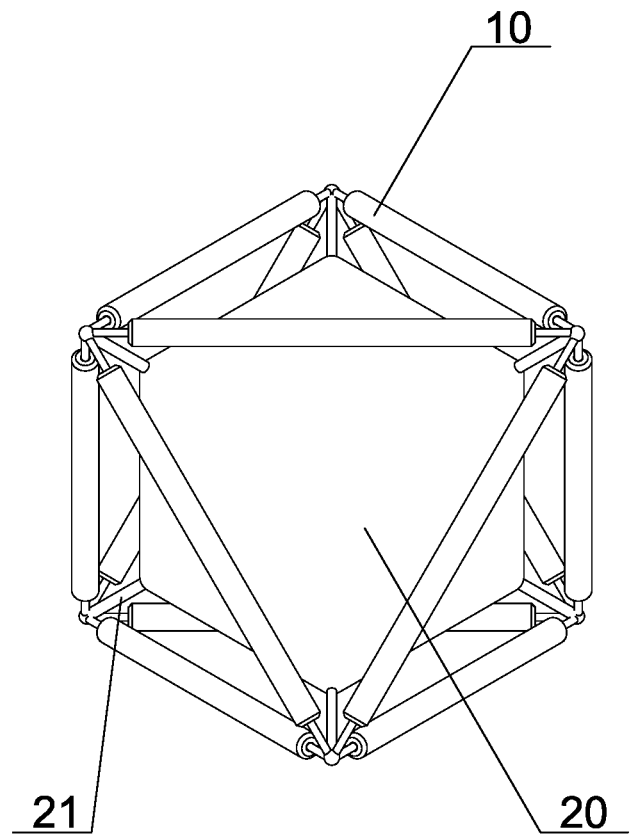
FIG. 9 is a second structural schematic diagram of Embodiment 4 of the present invention.

As shown in FIG. 8 and FIG. 9, the pet furniture for cats of the present embodiment includes an outer frame 10 and an inner house 20. The structure of each side of the outer frame 10 and the material of the inner house 20 are the same as that of Embodiment 1. The main difference between the present embodiment and Embodiment 1 is that the outer frame 10 of the present embodiment is a regular octahedral frame structure. The inner house 20 is a regular octahedron scaled down in volume according to the outer frame 10. The inner house 20 is fixedly suspended inside the outer frame 10. Specifically, the six vertices of the inner house 20 are respectively fixed at the six inner corners of the outer frame 10 by the connection members 21, so that the center of the inner house 20 overlaps with the center of the outer frame 10. The connection member 21 may be any one or a combination of an elastic connection member, a rigid connection member, or a flexible connection member.

Of course, the cross section of each side of the outer frame 10 of the present embodiment may be rectangular. Three sides on each side surface of the outer frame 10 are respectively provided with a strip-shaped slot along the lengthwise direction of each of the three sides, so that the pet furniture for cats can be expanded along the direction of each side surface. When the pet furniture for cats is expanded in the direction of each side surface, the strip-shaped slots on the side surface of one outer frame are screwed and connected to the strip-shaped slots on the side surface of another outer frame by bolts.

In the four above embodiments, each vertex of the inner house 20 are respectively fixed at the corresponding inner corner of the outer frame 10 by the connection member 21. However, the connection mode of the inner house 20 and the outer frame is not limited thereto, any mode is acceptable as long as the inner house 20 can be fixedly suspended in the interior space of the outer frame 10.

The outer frame 10 of the present invention is not limited to a regular polyhedral frame. The outer frame may be any polyhedral frame structure. The inner house 20 is not limited to a regular polyhedron scaled down in volume according to the outer frame 10. The inner house may be polyhedron having any other shapes or sphere, as long as the inner house can be suspended in the interior space of the outer frame 10.

In addition, in a preferred embodiment of the present invention, the center of the inner house 20 overlaps with the center of the outer frame 10. However, the arrangement of the inner house 20 of the present invention is not limited thereto, any mode is acceptable as long as the inner house is suspended in the interior space of the outer frame 10.

The specific embodiments of the present invention are described above, but the concept of the present invention is not limited thereto. Any insubstantial modification of the present invention using the concept should be considered as falling within the protection scope of the present invention.

What is claimed is:

1. A piece of furniture for pet cats, comprising:
a first outer frame,
a second outer frame, and
an inner house in at least one of the first outer frame or the second outer frame;
wherein
each of the first outer frame and the second outer frame is a polyhedral frame structure, and each of a plurality of sides of at least one surface of the first outer frame and the second outer frame is provided with a strip-shaped slot along a lengthwise direction of each of the plurality of sides;
wherein the first outer frame and the second outer frame are connected to each other through the strip shaped slot of each of a plurality of sides of at least one surface in each of the first outer frame and the second outer frame;
the inner house is fixedly suspended in an interior space of at least one of the first outer frame or the second outer frame by a plurality of connection members, and the inner house is provided with at least one entrance; and
the plurality of connection members are directly attached to inside portions of corners of at least one of the first outer frame or the second outer frame.

2. The piece of furniture for the pet cats according to claim 1, wherein the inner house is a polyhedron scaled down in volume according to the first outer frame or the second outer frame.

3. The piece of furniture for the pet cats according to claim 2, wherein a cloth cover is detachably provided on the at least one surface of the first outer frame through the strip-shaped slot.

4. The piece of furniture for the pet cats according to claim 2, wherein the first outer frame is a cubic frame; the inner house is a cube; and eight vertices of the inner house are respectively fixed at eight inner corners of the first outer frame by the plurality of connection members.

5. The piece of furniture for the pet cats according to claim 4, wherein four sides of the at least one surface of the first outer frame are respectively provided with the strip-shaped slot along the lengthwise direction of each of the four sides; a cloth cover is provided with four connection portions, and the cloth cover is detachably provided on the at least one surface of the first outer frame by passing the four connection portions through the strip-shaped slots correspondingly.

6. The piece of furniture for the pet cats according to claim 5, wherein the at least one surface comprises a top surface of the first outer frame and a bottom surface of the first outer frame.

7. The piece of furniture for the pet cats according to claim 1, wherein the inner house is a sphere.

8. The piece of furniture for the pet cats according to claim 1, wherein each side of the plurality of sides of the first outer frame is made of a metal rod, a wooden rod, or a metal rod sleeved with a wooden rod.

9. The piece of furniture for the pet cats according to claim 1, wherein each of the plurality of connection members is any one or a combination of an elastic connection member, a rigid connection member, and a flexible connection member.

10. The piece of furniture for the pet cats according to claim 2, wherein an outer surface of at least one side of the plurality of sides of the first outer frame or the second outer frame is wrapped with sisal rope.

11. The piece of furniture for the pet cats according to claim 1, wherein the at least one surface of the first outer frame comprises a top surface and the at least one surface the second outer frame comprises a bottom surface, and at least one bolt connects the top surface of the first outer frame to the bottom surface of the second outer frame.

* * * * *